United States Patent [19]

Laubengayer

[11] 4,075,440
[45] Feb. 21, 1978

[54] AUTOMATIC COMMUNICATION SYSTEM RECONFIGURATION APPARATUS

[75] Inventor: William C. Laubengayer, Marion, Iowa

[73] Assignee: Rockwell International Corporation, El Segundo, Calif.

[21] Appl. No.: 708,962

[22] Filed: July 26, 1976

[51] Int. Cl.$^2$ .............................................. H04B 3/46
[52] U.S. Cl. ........................179/175.3 S; 340/147 SC
[58] Field of Search ................... 179/175.3 S, 175.3 R, 179/175.31 R, 15 BF, 170 A; 333/3; 340/147 SC

[56] References Cited

U.S. PATENT DOCUMENTS

| Re. 28,958 | 9/1976 | Zafiropulo et al. | 340/147 SC |
| 3,371,165 | 2/1968 | Earle et al. | 179/175.3 R |
| 3,458,661 | 7/1969 | Forde et al. | 179/175.31 R |
| 3,519,935 | 7/1970 | Hochgraf | 179/175.31 R |
| 3,742,155 | 6/1973 | Buck et al. | 179/175.3 R |
| 3,983,340 | 9/1976 | Lima et al. | 179/175.3 S |

Primary Examiner—Douglas W. Olms
Attorney, Agent, or Firm—Bruce C. Lutz; Robert J. Crawford; L. Lee Humphries

[57] ABSTRACT

A communication system is illustrated wherein the communication links include automatically reversible amplifiers with the termination means of two links closing a loop. Upon failure of detection of a carrier signal in one of the links at the terminating end due to a break in that link, switches are automatically actuated to connect the momentarily unconnected portion of the broken link to the link that is still intact such that communication is restored in a new link configuration thereby accomplishing "fail-safe" operation without undue redundancy.

4 Claims, 6 Drawing Figures

AUTOMATIC COMMUNICATION SYSTEM RECONFIGURATION APPARATUS

THE INVENTION

The present invention generally relates to electronics and more specifically relates to communication systems.

The only known prior method of improving reliability in communication systems involves totally redundant installations. Each user of the system must switch from one cable to another identical cable system either manualy or automatically in the case of a failure in the main system. This technique results in excess cost and complexity over a system such as the present which requires only a single set of amplifiers and does not require manual switchover.

In operation, the present system is directed toward a dual frequency communication system involving a plurality of dual frequency channels. The system as designed uses a plurality of bidirectional amplifying means. A carrier is incorporated into the communication system which carrier signal is detected by detecting means for connecting the bidirectional amplifier systems in a forward or reverse mode. As long as there is no break in either of the lines, the amplifiers will remain in the forward mode. In the event of a break in the line, detection apparatus further down the line determines there is no longer the carrier reference signal and thereupon actuates switches to effectively connect the previous ends of two lines together, thereby extending the effective length of the unbroken link. Thus, there is a reconfiguration of the communication system with those amplifiers and telephones in circuit with the unbroken link.

It is, therefore, an object of the present invention to provide improved reliability in a communication system.

Other objects and advantages of the present invention will be apparent from a reading of the specification and appended claims in conjunction with the drawings wherein:

DETAILED DESCRIPTION

Figure 1:
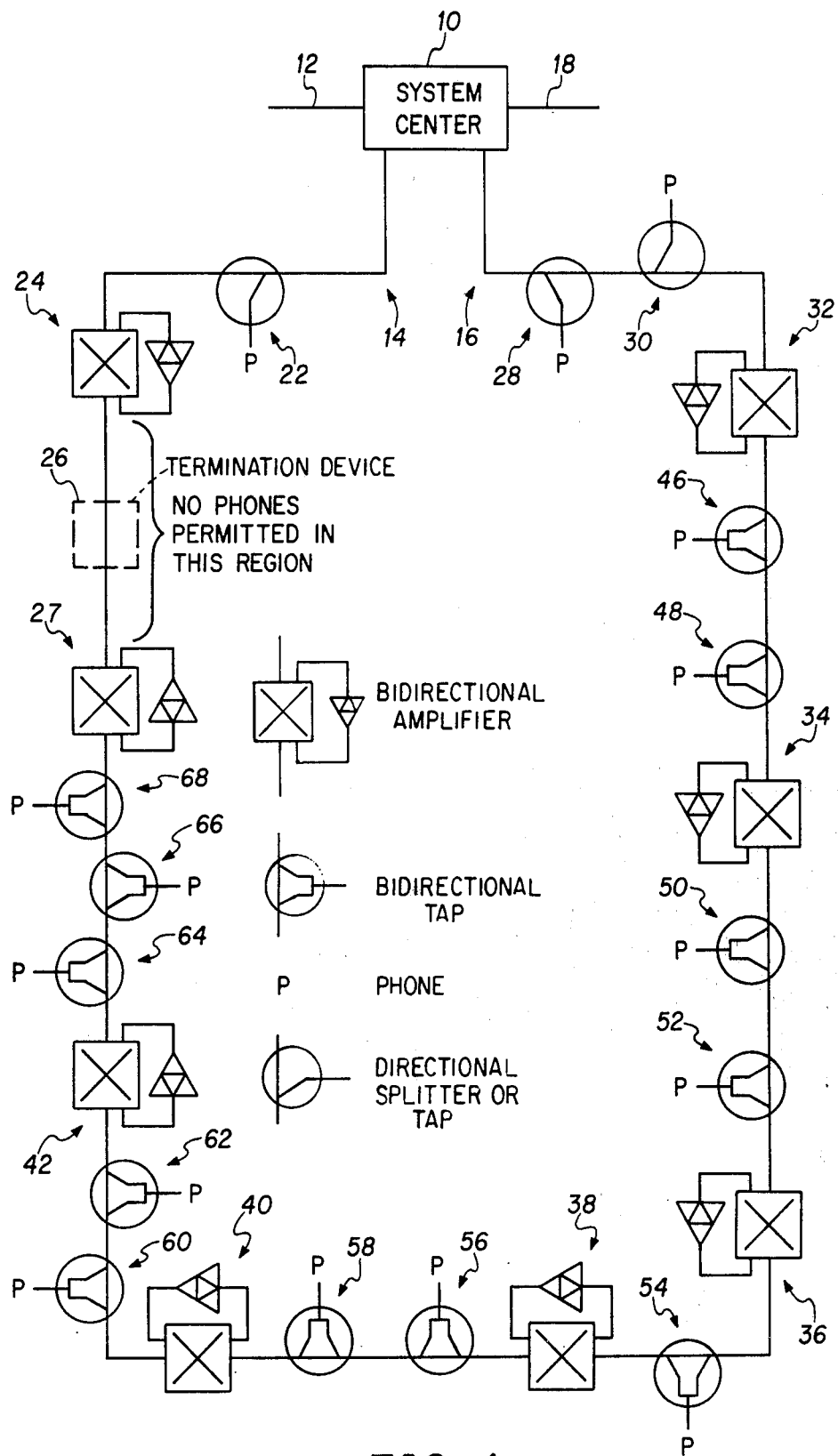
FIG. 1 is a block schematic diagram of a communication system incorporating the present concepts.

In FIG. 1, a system center, or master station 10, for transmitting a carrier whether or not there are communication signals being transmitted, is illustrated having communication links 12, 14, 16 and 18. Only two of the links, 14 and 16, are illustrated with connections for detailing the circuitry involved to practice the present invention.

As illustrated, communication link 14 is very short and comprises a first unidirectional coupler and phone 22 and a bidirectional amplifier section 24. As will be later explained, phone 22 and section 24 may be replaced by a termination device 26 shown in dashed lines. In normal operation, communication link 14 is terminated by the output impedance of a further bidirectional amplifier section 27. Communication link 16 on the other hand, includes a first unidirectional coupler and telephone 28 and a second similar unidirectional coupler and telephone 30 prior to a bidirectional amplifier 32. Further bidirectional amplifiers in this link are labeled 34, 36, 38, 40, 42 and 27. A plurality of bidirectional couplers and telephones are sequentially labeled 46, 48, 50, 52, 54, 56, 58, 60, 62, 64, 66 and 68.

Figure 2:
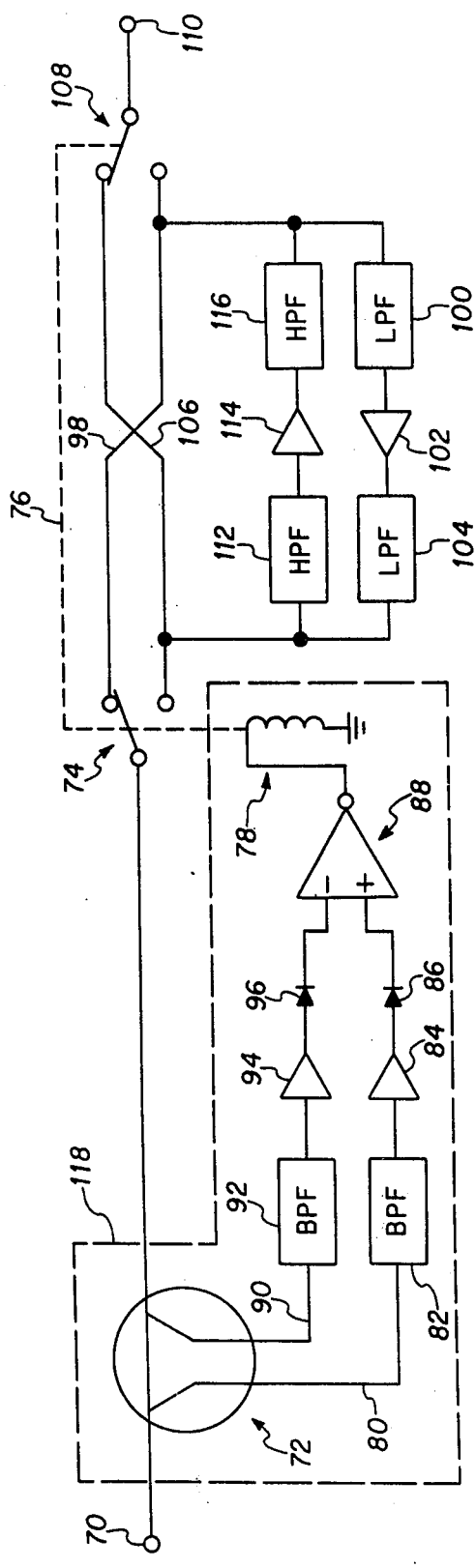
FIG. 2 is a detailed block diagram illustrating a bidirectional amplifier section of FIG. 1.

In FIG. 2, a detailed circuit is illustrative of a bidirectional amplifier section including a detector section such as would be incorporated in any one of the bidirectional amplifiers (e.g., 32) of FIG. 1. In FIG. 2, a line 70 connectes to one lead of a bidirectional coupler 72 which has its other end connected to the input of a switch generally designated as 74 and is operated by a dash line control 76. Dashed line control 76 is operated by a relay generally designated as 78. The bidirectional coupler 72 has a further output lead 80 connected to the input of a bandpass filter 82 whose output is connected through an amplifier 84 and a detecting diode 86 to the positive or non-inverting input of a differential amplifier 88 whose output controls relay 78. A final output 90 of bidirectional coupler 72 is passed through a bandpass filter 92, an amplifier 94 and a detecting diode 96 to the negative or inverting input of amplifier 88. As illustrated, the switch 74 has a movable contact connecting a lead 98, which provides an input, to a lowpass filter 100 whose output is supplied through an amplifier 102 to a lowpass filter 104. The output of lowpass filter 104 is connected to a lead 106. A movable contact of a switch 108 is shown connected to lead 106 and to an output terminal 110. The movable contact of switch 108 is also operated by control mechanism 76 and operates simultaneous with the switch 74. Lead 106 is also connected to the input of a highpass filter 112 whose output is connected through an amplifier 114 and through a highpass filter 116 to lead 98.

In one embodiment of the invention, a carrier signaling frequency of 53 megahertz was used and thus the bandpass filters 82 and 92 had a center frequency of approximately 53 megahertz. The filters 112 and 116 on the other hand were highpass filters which passed all frequencies above 50 megahertz while the filters 100 and 104 were lowpass filters which passed all frequencies from at least as low as 5 MHz up to 30 MHz. While the gains of amplifiers 102 and 114 could be any set or adjustable value, one embodiment of the invention used a 30 dB gain in amplifier 114 and a 15 dB gain in amplifier 102. The diodes 86 and 96 are very crude intelligence signal detectors utilizing a single diode but operate satisfactorily for the purpose intended. The bidirectional coupler 72 is merely a combination of two directional couplers such as illustrated in FIG. 4.

Figure 3:
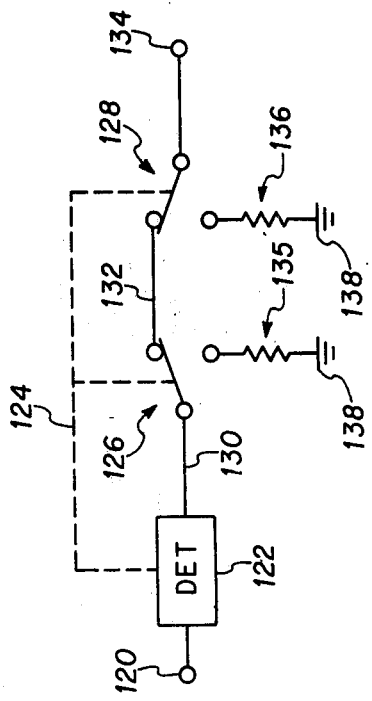
FIG. 3 is a detailed diagram illustrating a terminating section of FIG. 1.

In FIG. 3, an input 120 is supplied through a detecting mechanism similar to that described in the dashline block 118 of FIG. 2. Detector 122 has an output represented by dashed line 124 which operates movable switches 126 and 128. An electrical output appearing on lead 130 is electrically connected to the movable contact of switch 126 and as shown connects to a lead 132 and through the movable contact of switch 128 to an output terminal 134. In operation, both of the switches 126 and 128 operate simultaneously and if altered from the present position would connect one end of each of resistors 135 and 136 such that the terminals 120 and 134 are terminated through these resistors to ground 138.

Figure 4:
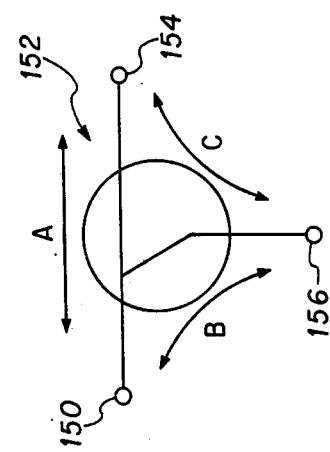
FIG. 4 is an illustrative diagram of a directional coupler for use in explaining system operation.

In FIG. 4, a terminal 150 is connected through a directional coupler 152 to an output terminal 154 and to a further output terminal 156. As illustrated, the signals going in either direction between 150 and 154 are illustrated as A while the signals from 150 to 156 and vice versa are illustrated as B and signals going from 156 to 154 and vice versa are illustrated as C.

Figure 5:
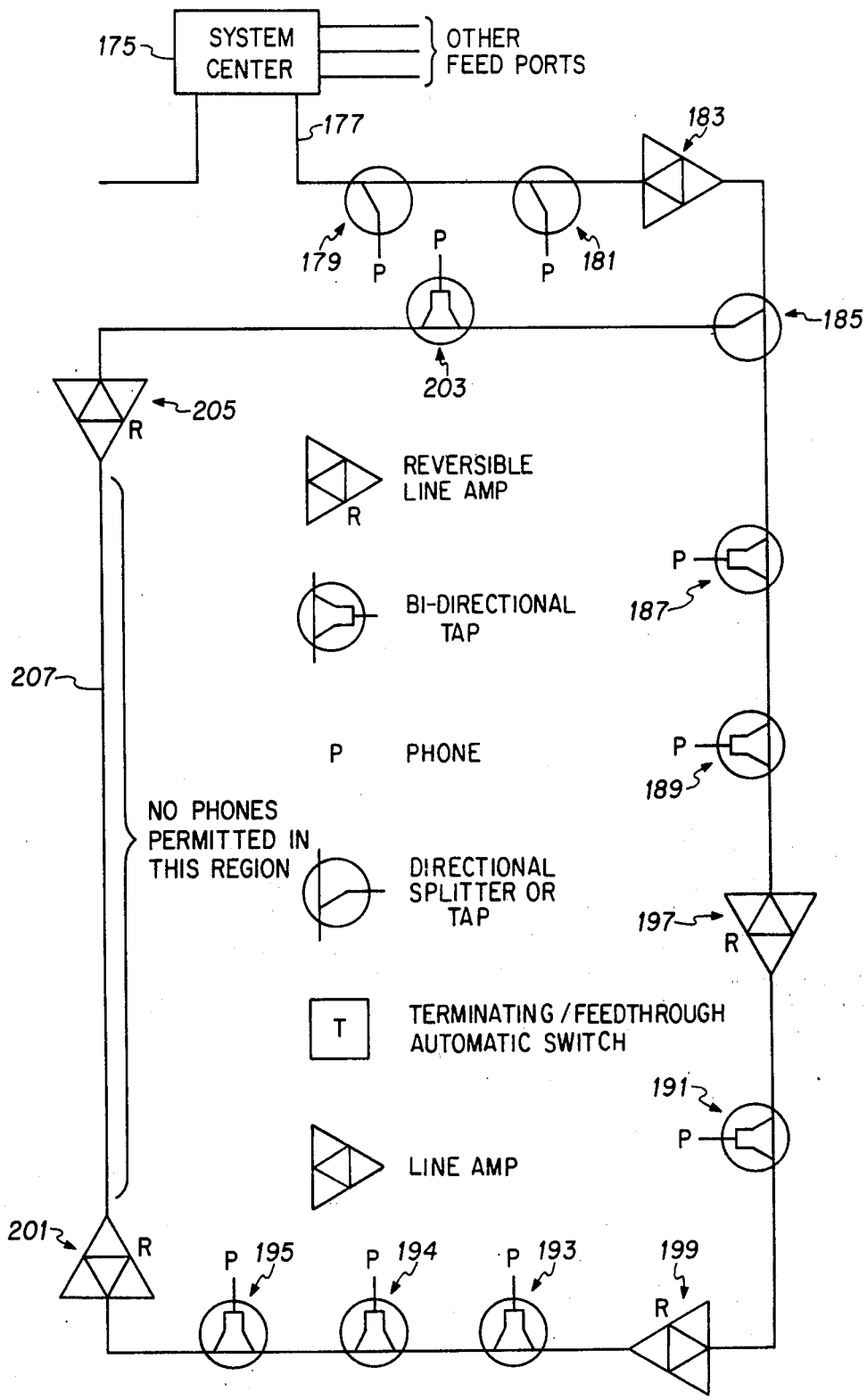
FIGS. 5 and 6 present further species of the system presented in FIG. 1.

In FIG. 5, a system center 175 supplies signals to various output lines including a line 177 which is passed to phones 179 and 181 through unidirectional taps. The signal is then supplied through a bidirectional but non-reversible amplifier 183 to a directional splitter or tap 185. A first output of 185 is passed through a line connecting phones 187, 189, 191, 193, 194 and 195 each connected to bidirectional splitters or taps and having reversible bidirectional amplifiers 197, 199 and 201 as shown. The other output of tap 185 is connected to a telephone 203 and to an input of a reversible amplifier 205. A line 207 is connected between the outputs of the two amplifiers 210 and 205 in a manner similar to that of the connection between amplifiers 24 and 27 in FIG. 1 with no telephones being permitted in this area. The first link would be normally designated as the portion between the one output of splitter 185 through the plurality of telephones from 187 to 195 and terminating in the output of amplifier 201. The other link would be the short link including the telephone 203 and terminating in the output of amplifier 205.

Figure 6:
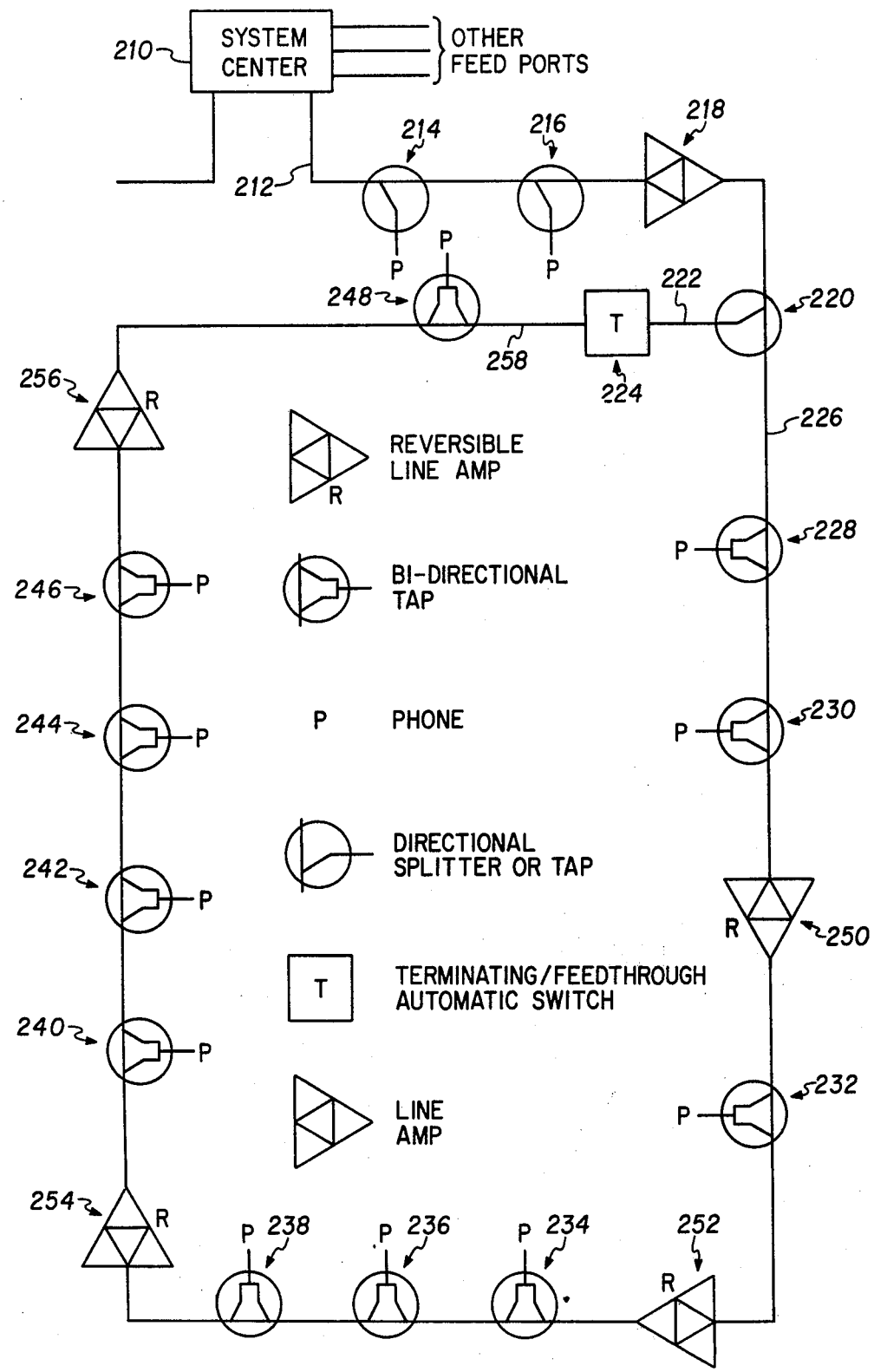

In FIG. 6, a further system center 210 again has various outputs in a manner similar to that of FIG. 5 and includes an output 212 feeding phones 214 and 216 and then through a bidirectional amplifier 218 to a directional splitter or tap 220. One output of tap 220 immediately terminates through a line 222 to a terminating means 224 substantially identical to that of FIG. 3. The other link is fed through a line 226 including phones 228, 230, 232, 234, 236, 238, 240, 242, 244, 246 and 248 along with bidirectional reversible amplifiers 250, 252, 254 and 256 before terminating on a lead 258 and the terminating means 224.

As will be noted, the primary difference between FIGS. 5 and 6 is that in one case the amplifiers 201 and 205 terminate into the output of each other and there are no phones permitted in that intermediate region designated as 207. In FIG. 6, on the other hand, there are phones in this area and the termination is accomplished by a separate device 224.

OPERATION

Referring first to FIG. 4, it will be realized by those skilled in the art that FIG. 4 is illustrative of a standard type cable television directional coupler. The impedance looking into any of the terminals 150, 154 and 156 is 75 ohms. The signal loss in path A is typically from 0.5 to 3.5 dB. The signal loss in path B is set by design and normally ranges from 3.5 to 30+ dB. The loss through path C is determined by external matching but can be expected to be in the range of 30 dB. As designed and used in the present invention, typical choices for these paths are respectively A=0.5 to 1.0 dB, B=8 to 12 dB, and C=24 to 30 dB.

From the above, it will be determined that signals attempting to pass from 150 to either of the other two outputs will be attenuated only slightly. However, signals attempting to pass from 154 to terminal 156 will be attenuated a large amount. This feature is very helpful in attempting to determine the direction or origin of a signal since if a detector is placed at 156, it will receive much higher amplitude signals if initially received by the coupler from 150 than if received from 154.

As will be realized from later discussions, use of a single directional coupler has some drawbacks which are not obvious from a theoretical standpoint. If the differential between the magnitude of the forward and reflected signals fed to the output 156 does not exceed 30 dB, the detection device (amplifier and diode) can react to signals flowing in either direction. A further drawback is that if the fault resulting in a switchover is a broken coaxial cable near terminal 150, the detection device will respond to the resulting reflected signal when in the reverse mode.

For the above reasons, a bidirectional coupler such as illustrated by 72 in FIG. 2 was designed to deliver two output signals. One of these signals corresponds to the forward traveling 53 MHz reference on lead 80 and the other corresponding to the reverse signal and appearing on output 90. Functionally, it is the equivalent of two of the standard devices in series with one of them merely reversed. If these two outputs are filtered and amplified and connected to a comparator as is illustrated in dash line block 118, a circuit will result such that the output of amplifier 88 is high in normal operation thereby holding switch relay 78 energized and will become low only in the event that there is a break in the line thereby resulting in a reverse flow of carrier current. Thus, due to the design of 118, carrier current flowing from 70 to 110 will activate relay 78 but carrier current flowing from 110 to 70 will not activate relay 78. From the above, it will be realized that the output of amplifier 88 will remain low during a reverse flow of carrier current. As mentioned, the circuitry of FIG. 2 is representative of the bidirectional amplifiers numbered from 32 to 42 in FIG. 1 as well as amplifiers 24 and 27. Each of these bidirectional amplifiers in FIG. 1 is reversible and is operationally identical with those illustrated in FIGS. 5 and 6 with the "R" adjacent. The similar amplifiers merely labeled as line amplifiers such as 183 and 218 are bidirectional but non-reversible and thus do not have the control circuitry 118 and its associated switches 74 and 108.

In normal operation, with the carrier passing the correct direction from left to right the relay 78 is in an energized or operated condition. The theory being that there is power available as long as there is no break in the communication link. Thus, if there is a break in the line and there is no longer any carrier, the relay will deenergize and switch to the condition shown for reversing the signal. The relay will remain in this condition even though a carrier is resumed from the opposite direction. In other words, convention and the drawing shows the relay switches in their unenergized condition and thus the condition in which the carrier would be flowing from right to left.

Using this basis, it will be noted that the signals, including the carrier, from the system center are passed from left to right under normally energized operating conditions and passed through the highpass filters 112 and 116 and accordingly through amplifier 114 and directly out through the movable contact switch 108 in the down position to the output terminal 110. Low frequency signals in the range of 5 to 30 MHz from down stream telephones are passed back through lowpass filters 100 and 104 after being amplified by amplifier 102.

The termnation means of FIG. 3, which is represented by block 26 in FIG. 1, incorporates a detector 122 which is substantially identical to that of 118 in FIG. 2. Again, the relay contacts are shown in the unenergized condition and upon energization of the system both of the contacts for switches 126 and 128 would be placed in the downward condition thereby terminating the line connected to input 120 through resistor 135 to ground and connecting the line attacked to input 134 through resistor 136 to ground 138. As will be later determined, the carrier in the design illustrated activates line 124 only from one direction of reception.

Returning to FIG. 1, it will be noted that there is an area between amplifiers 24 and 27 wherein no telephones may be connected. In operation, the system center 10 provides output signals on all lines including not only 14 and 16 but 12 and 18 as well. These output signals comprise a signalling carrier and one or more modulated signals such as frequency modulation, single sideband suppressed carrier, etc., to the various phones with both types of taps such as 46 and 22. If there is only one modulated signal available, all phones will be actuated with response to such a signal and the operation will be of a party-line type. The portion of the system which is in the fail-safe area would be the portion between the output of amplifier 32 and the input to amplifier 27. This area contains telephones with bidirectional taps such that they can receive communications from either direction. During normal operation, the link commencing with lead 16 extends to amplifier 27 which terminates its signal at the output of amplifier 24. Thus, any conversations between a phone such as 60 and the system center 10 is received on line 16 from amplifier 40 and is returned through amplifier 40 back to the system center on line 16. If, however, a break occurs at a point such as between phones 56 and 58, amplifiers 27, 40 and 42 automatically reverse since they no longer receive the signal in the detection means such as illustrated in 118 of FIG. 2. This causes a reversal of the amplifying connections and the signals sent out from system center 10 are received by telephone 60 from amplifier 42. The return signals are passed back through amplifier 42 to be received by the system center on line 14. There is a possibility that the impedances seen by telephones 56 and 58, due to a break in the line therebetween, will be such as to cause standing waves and prevent proper operation of these two telephones. However, these phones will work in some instances and the amplifiers 38 and 40 isolate the effects of the break from other phones on the loop and thereby allow and provide communication between all of their phones and the system center. As will be realized, the breakage in the line between telephones 56 and 58 will cause a reaction in amplifiers 27 and 24 to reconfigure the communication link 14 from merely including a single phone 22 to that of including the phones from 58 to 68 in addition. The communication link 16 on the other hand, is reconfigured to only include the phones from 28 through 56. As designed, the phones 22, 28 and 30 are in an area in which fail-safe conditions are not required or in other words are easily accessible areas and thus they will always receive their signals on lines 14 and 16, respectively, as illustrated. A breakage between the system center and phone 22 would of course completely inactivate phone 22. Since phone 22 is the only phone on communication link 14 during normal operation of the circuit, communication link 16 is not affected and although amplifier 24 would reverse, there would be no total effect on the system operation.

The dashed line block 26 represents the subject matter of FIG. 3 and may be used in the system of FIG. 1 in place of or in addition to bidirectional amplifiers 24 and 27. Otherwise, the operation and performance of FIG. 1 would remain substantially the same.

FIG. 5 is very similar to FIG. 1, except that it illustrates that the two communication links do not need to receive their signals directly from the system center. As illustrated, the system is secure and does not need to be fail-safe for the phones 179 and 181 and further the directional splitter 185 is also in a secure area. The areas beyond splitter 185 need to be fail-safe and thus each of the phones is illustrated with bidirectional taps. Again, no phones are permitted between the reversible amplifiers 201 and 205 since each of these is using the other as an impedance matching device to permit proper operation of the communication link and a phone in this area would receive (possibly) interfering signals from both amplifiers. Upon a breakage such as between telephone 191 and amplifier 199, the amplifiers 201 and 199 would reverse such that the communication signals from the system center 175 would be received by phones 193 through 195 from the same source as does phone 203. Therefore, the system is reconfigured in much the same manner as FIG. 1.

In FIG. 6, a termination device 224 is illustrated which is basically that illustrated in FIG. 3. During normal operation, the tap connected to lead 222 is directly terminated through a terminating resistor in means 224. The communication link which is fail-safe extends from lead 226 around the loop to phone 248. This phone is terminated through line 258 to a resistor in the termination means 224 under normal operating conditions.

In this system, D.C. power is carried on the coax cable. Various chokes and capacitors steer R.F. and the D.C. power down the correct paths.

As will be noted, amplifier 218 as well as amplifier 183 of FIG. 5 are illustrated as being bidirectional but non-reversible since these amplifiers are in an area which can always be serviced and thus do not need to be part of the reversible fail-safe link or links. It will be further noted that the meaning of each of the symbols in FIGS. 5 and 6 as well as most of the symbols of FIG. 1 are designated in FIG. 6. The symbology in FIG. 1 for the reversible amplifiers is illustrated differently to more nearly comply with that of FIG. 2 but internally would comprise the same components as a reversible amplifier of FIGS. 5 and 6, such as 256.

The discussion to this point has referred to telephones attached to the line and to signals being passed in two directions simultaneously. This description has been given only because it matches the first application of the invention. The line attachments can be any suitable item, not telephones alone. As all sense and control of the switched amplifiers is a result of signals being passed in one direction, only these signals must be present for proper operation. As will be further realized, if only one way communication is required the "fail-safe" amplifiers may be designed to be unidirectional but still reversible.

To summarize, the present inventive concept is to use reversible amplifiers in one or both of two communication liks which communication links have their ends in proximity or in a common terminating section. Upon a break in one of the links, the appropriate amplifiers reverse their normal directional operation due to loss of a carrier signal which is normally used to activate internal switches. Upon reversal of the amplifiers, the system is reconfigured so that some of the telephones receive their incoming signals from the other direction than previously received. This concept allows a "fail-safe" condition since a break in the line does not destroy communications but merely alters the direction of receipt of these signals. As will be realized, two different methods of terminating the lines so that they are usable to transmit signals in the opposite direction after a break, are shown. Other methods and means of termination will be realized by those skilled in the art. Further, other designs will be apparant for the devices of FIGS. 2 and 3. Thus, I wish to be limited not by the specific embodiments illustrated, but only by the inventive concept as defined in the appended claims.

What is claimed is:

1. Apparatus for automatically reconfiguring a communication system upon a break in one of two links comprising, in combination:
    a first communication link having first and second ends and including therebetween,
    a plurality of first amplifying means,
    switch means associated with each of said first amplifying means,
    detection means, connected to said first link and to said switch means, for connecting said first amplifying means in a direction corresponding to the direction of travel of a reference signal, and
    a plurality of communication stations located along said first link;
    a second communication link having first and second ends and including therebetween,
    a plurality of second amplifying means,
    switch means associated with each of said second amplifying means,
    detection means, connected to said second link and to said switch means, for connecting said second amplifying means in a direction corresponding to the direction of travel of a reference signal, and
    a plurality of communication stations located along said second link;
    master communication means, connected to said first ends of said first and second communication links, for supplying said reference signal and communication signals to said first and second links; and
    termination means connected to both of said second ends for impedance matching the ends of said first and second links to reduce reflected signals.

2. Apparatus as claimed in claim 1 comprising, in addition:
    detection means connected to said second ends for passing communication signals through said termination means upon failure of detection of the reference signal received from a given direction at one of said second ends.

3. The method of automatically reconfiguring a pair of terminated communication links having reversible transmission capability, where the terminated sections are in close proximity, upon a break in one of the links to restore operation to the broken portion by connecting it to the other link comprising, the steps of:
    transmitting a carrier through each of the communication links;
    detecting the reception of said carrier at the termination section of one of the communications links; and
    electrically connecting the terminated sections to pass communication signals therethrough upon failure to detect the reception of said carrier from a given direction.

4. Apparatus for automatically reconfiguring a pair of terminated communication links at least one of which has reversible signal transmission capabilities where the terminated sections of the communication links are in close proximity upon a break in said at least one communication link having reversible transmission capability to restore operation to the broken portion by connecting it to the previous end of the other link comprising, in combination:
    means for transmitting a carrier through each of the communication links to the terminated sections;
    means for detecting the reception of said carrier at the termination section of said at least one communication link having reversible transmission capability; and
    means for electrically connecting the terminated sections to pass communication signals therethrough upon failure to detect the reception of said carrier being received from a given direction at the terminated section of said at least one communication link having reversible transmission capability.

* * * * *